United States Patent
Bhatia et al.

(10) Patent No.: US 6,694,075 B1
(45) Date of Patent: Feb. 17, 2004

(54) APODIZATION OF OPTICAL FILTERS WITH MULTIPLE EXPOSURES OF PHOTOSENSITIVE MEDIA

(75) Inventors: Vikram Bhatia, Painted Post, NY (US); Thomas A. Cook, Corning, NY (US); Robert A. Modavis, Painted Post, NY (US); Christopher D. Robson, Elmira, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/340,481

(22) Filed: Jun. 30, 1999

Related U.S. Application Data
(60) Provisional application No. 60/091,366, filed on Jul. 1, 1998.

(51) Int. Cl.[7] .................................................. G02B 6/34
(52) U.S. Cl. ........................................ 385/37; 359/569
(58) Field of Search ....................... 385/37, 10; 359/569

(56) References Cited

U.S. PATENT DOCUMENTS

| | | | |
|---|---|---|---|
| 5,309,260 A | 5/1994 | Mizrahi et al. ................. 359/3 |
| 5,367,588 A | 11/1994 | Hill et al. ...................... 385/37 |
| 5,629,998 A | 5/1997 | Cook et al. .................... 385/51 |
| 5,636,304 A | * 6/1997 | Mizrahi et al. ................ 385/37 |
| 5,717,799 A | 2/1998 | Robinson ...................... 385/37 |
| 6,130,973 A | * 10/2000 | Lauzon et al. ................ 385/37 |
| 6,307,679 B1 | * 10/2001 | Kashyap ..................... 359/569 |
| 6,310,996 B1 | * 10/2001 | Byron ......................... 385/37 |

* cited by examiner

Primary Examiner—Frank G. Font
Assistant Examiner—Michael P. Mooney
(74) Attorney, Agent, or Firm—Thomas B. Ryan; Mary Y. Redman; Svetlana Z. Short (57) ABSTRACT

Filter gratings are formed in optical waveguides having photosensitive cores by exposing the cores to actinic radiation in the form of interfering beams having peak intensities that are relatively displaced along an optical axis of the waveguides. Each of the interfering beams has a single-lobed intensity profile and a degree of spatial coherence required to achieve a desired fringe contrast between the two relatively displaced beams. Index modulations in the photosensitive core match the illumination (interference) pattern of the radiation. The relative displacement of the interfering beams reduces side lobes of the gratings' spectral responses by leveling the average refractive index of the index modulations. A second exposure with the two beams but without the beams' interference effects further levels the average refractive index.

30 Claims, 4 Drawing Sheets

APODIZATION OF OPTICAL FILTERS WITH MULTIPLE EXPOSURES OF PHOTOSENSITIVE MEDIA

The application claims benefit of Provisional Appl. No. 60/091,366, filed Jul. 1, 1998.

BACKGROUND OF THE INVENTION

This invention relates to the field of optical filters formed in photosensitive optical media, and more particularly, to grating formation or apodization.

Optical filters formed in photosensitive optical media by patterned exposure (e.g., interference) to actinic radiation generally have band-pass or band-stop spectral response profiles. Competing requirements for refractive index variations in the media add undesirable "structure" (e.g., side lobes) to the response profiles, which is treatable by various apodization techniques.

Bragg gratings and long period gratings are examples of optical filters that can be formed in photosensitive media by patterned exposure to actinic radiation. The optical filters typically have cores that are doped with a photosensitive material, such as germanium, that enables the cores to change in refractive index in response to the exposure to actinic radiation, which is generally within the ultraviolet spectrum. The impinging radiation generally raises the refractive index of the exposed portions of the core proportional to the radiation's intensity and the length (time) of exposure.

The required patterning, which controls both coupling strength and grating period, can be accomplished by interference or masking. Bragg gratings typically have periods less than one-half of the central wavelength of the spectral response, which is best accomplished by angularly interfering two beams of the actinic radiation. Long period gratings typically may have periods 100 to 1000 times as large and can be written by simple masking. For example, an amplitude mask can be patterned to allow spatially separated bands of light to illuminate a fiber core for forming a long period grating.

Regardless of the mode of exposure, the intensity profile of the impinging radiation translates into a similarly shaped refractive index profile of the core. For example, an impinging beam with a constant intensity profile subject to interference or masking produces uniform index modulations and a constant average index along the exposed portion of the core. The resulting spectral response, however, has large side lobes on both sides of the desired band stop. An impinging beam with a more typical Gaussian shape produces index modulations and an average refractive index that also follow the Gaussian shape. The Gaussian variation in the magnitude of the index modulations is helpful toward removing the opposite side lobes, but the accompanying change in the average refractive index produces progressive changes the effective period of the grating and typically produces side lobes on one side of the desired band stop.

Correction of the gratings to remove the undesired side lobes is sometimes referred to as "apodization" because it involves a "shading" of grating amplitude. The goals of apodization are generally to achieve a pulse-shaped variation (e.g., Gaussian or more generally, a shape that increases to a peak and then decreases) in the magnitude of the index modulations while maintaining a constant effective period throughout the grating length. Many of the known techniques for apodizing optical gratings are expensive, time consuming, or difficult to carry out to required accuracy.

For example, U.S. Pat. No. 5,367,588 to Hill et al. teaches the mounting of a nonlinear phase mask next to the photosensitive optical filter media for exposing the media to an unevenly spaced interference pattern. The phase mask, which itself functions as a grating, divides a beam of actinic radiation having a Gaussian intensity profile into two interfering beams that form the uneven interference pattern. A varying pitch of the resulting filter grating compensates for the change in average refractive index that parallels the combined intensity profile of the illuminating beams. Such special nonlinear phase masks are expensive to manufacture and can add significant cost to the production of optical filters.

U.S. Pat. No. 5,717,799 to Robinson also proposes to correct an unwanted variation in average refractive index accompanying a desired variation in the magnitude of the index modulations by varying the grating period. Suggestions for achieving this objective include individually writing the grating elements or differentially straining portions of the grating during formation (exposure) of the grating elements. With periods as small as one-half micron for typical Bragg gratings, the writing of individual grating elements is not very practical, and differential straining of grating portions would greatly complicate manufacture and lead to potentially inconsistent results.

U.S. Pat. No. 5,309,260 to Mizrahi et al. teaches the use of successive exposures for apodizing Bragg gratings. The first exposure is performed with two interfering beams having Gaussian profiles for producing the required variation in index modulations. A second exposure with a single beam raises the average refractive index at one end of the grating for suppressing subsidiary peaks (fine structure) of the filter's spectral response. However, variations in the average refractive index remain along grating length, which can function similar to a "chirp" and produce an unwanted temporal dispersion in the filtered signals.

SUMMARY OF INVENTION

Our invention shapes the response curves of optical filters including Bragg gratings and long period gratings by at least partially separating variations in the magnitude of index modulations from variations in the average refractive index along a optical axis of the filters. For example, a first two-beam exposure can be used to write index modulations along the optical axis of the filter, and a second two-beam exposure can be used to adjust the average refractive index of the index modulations along the optical axis.

During the first exposure, two beams of actinic radiation can be arranged to form an interference pattern of appropriate period on a photosensitive core of the intended optical filter. The two beams preferably originate from a common spatially coherent beam having an approximately $\text{sinc}^2$ intensity profile. Axes of the two beams are inclined to each other for adjusting the fringe spacing of the interference pattern and are preferably located in a common axial plane of the filter orienting the fringes transverse to the optical axis of the filter. A crossing point of the two axes is preferably offset from the optical axis so that the two axes are relatively displaced along the optical axis.

Ordinarily, any such offset would greatly reduce fringe contrast because the interfering beams are spatially offset from each other at their point of intersection with the optical axis of the filter. However, a spatial filter can be used for shaping the common beam, which enhances the spatial coherence of the resulting interfering beams to accommodate their required misalignment. The resulting interference pattern is somewhat shorter but retains a pulse-shaped contrast profile and the same fringe spacing. The combined intensity profile of the two beams is affected most.

Offsetting peak intensities of the interfering beams along the optical axis of the filter reduces axial variation of the combined intensities of the beams within their region of overlap. The effect on the filter is to provide a more constant average refractive index within the region of overlap, while preserving a desired pulse-shaped variation in the magnitude of index modulations in the same region. The fringe contrast, which is the basis for the index modulations, decreases toward the ends of the overlap regions because of differences in intensity between the two beams. The new filter has a flattened spectral response with reduced side lobe structure.

During a second exposure, two beams are again used simultaneously in positions that are spaced apart along the optical axis of the filters. However, the spacing between the beams differs between the exposures. The first exposure forms the desired index modulations, and the second exposure cooperates with the first exposure to further level the average refractive index. The two beams can originate from the same source including the source for the interfering beams of the first exposure. However, the second exposure is not used to rewrite index modulations in the filter medium. For example, the spatial filter can be replaced by an amplitude mask that further shapes the overlapping beams but reduces spatial coherence enough to prevent fringes from forming. Alternatively, the filter medium can be dithered to average exposure intensities of the patterned illumination (i.e., "wash out" the fringes).

The index modulations of Bragg gratings are preferably written with either an interferometer or a phase mask, and a similar setup is preferably used for the second exposure. The two exposures are cumulative so their order can be reversed. The index modulations of long period gratings can be written with less sensitive instrumentation. For example, a rectangular function amplitude mask can be used to write the grating. However, a phase mask producing two diverging beams is preferably substituted for the amplitude mask to adjust the average refractive index at both ends of the grating and is preferably dithered for washing out any fringes.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Figure 1:
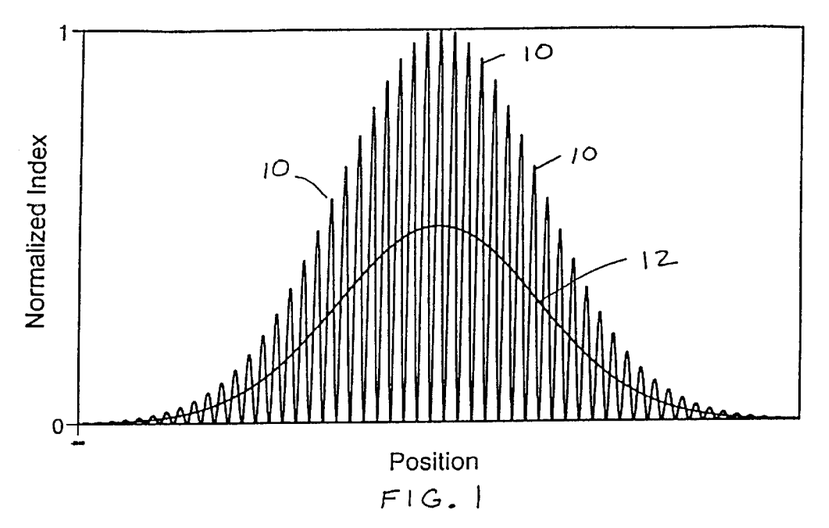
FIG. 1 is a graph of photo-induced changes in refractive index as a function of position along an optical grating formed by exposure to an interference pattern between two completely overlapping beams.
Figure 2:
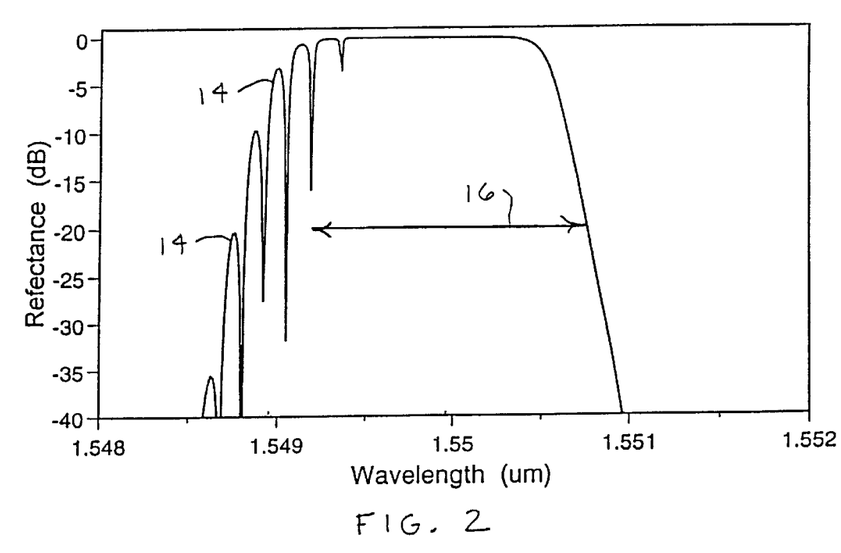
FIG. 2 is a graph of the expected spectral response of the grating of FIG. 1 in terms of reflectance as a function of wavelength.

The first two drawing figures, FIGS. 1 and 2, graph the results expected in the past from exposing a photosensitive core of an optical waveguide to two interfering beams having Gaussian intensity profiles. The two beams produce an interference pattern that varies in fringe contrast along the photosensitive core as a function of the combined Gaussian intensity profiles of the beams. The refractive index of the core, which in this instance increases as a function of the exposure intensity, varies in accordance with the fringe contrast of the interference pattern. Accordingly, the resulting index modulations 10 vary in magnitude along the core in accordance with the Gaussian intensity profile of the combined beams.

For clarity, only a few of the usual number of index modulations 10 are shown. (The index modulations 10 of Bragg gratings operating at infrared wavelengths around 1550 nm are typically spaced at a period of approximately one-half microns.) The peak-to-trough magnitude variations of the modulations 10 along the photosensitive core progressively diminish from either side of center as desired, but the associated variation in the average refractive index traced by line 12 has the undesirable consequence of varying the effective grating period, i.e., the optical path lengths of the periods. Conditions for reflectivity are met by additional wavelengths beyond those of a desired band, and the resulting gratings can exhibit a chirp that can produce unwanted temporal dispersion of the filtered signals.

FIG. 2 shows a graph of the expected spectral response of a grating having the refractive index pattern shown in FIG. 1. The resulting spectral response includes side lobes 14 containing reflections of lower wavelengths outside a desired reflectance band 16, which are sometimes referred to as adding undesirable "structure" to the response profile.

Figure 6:
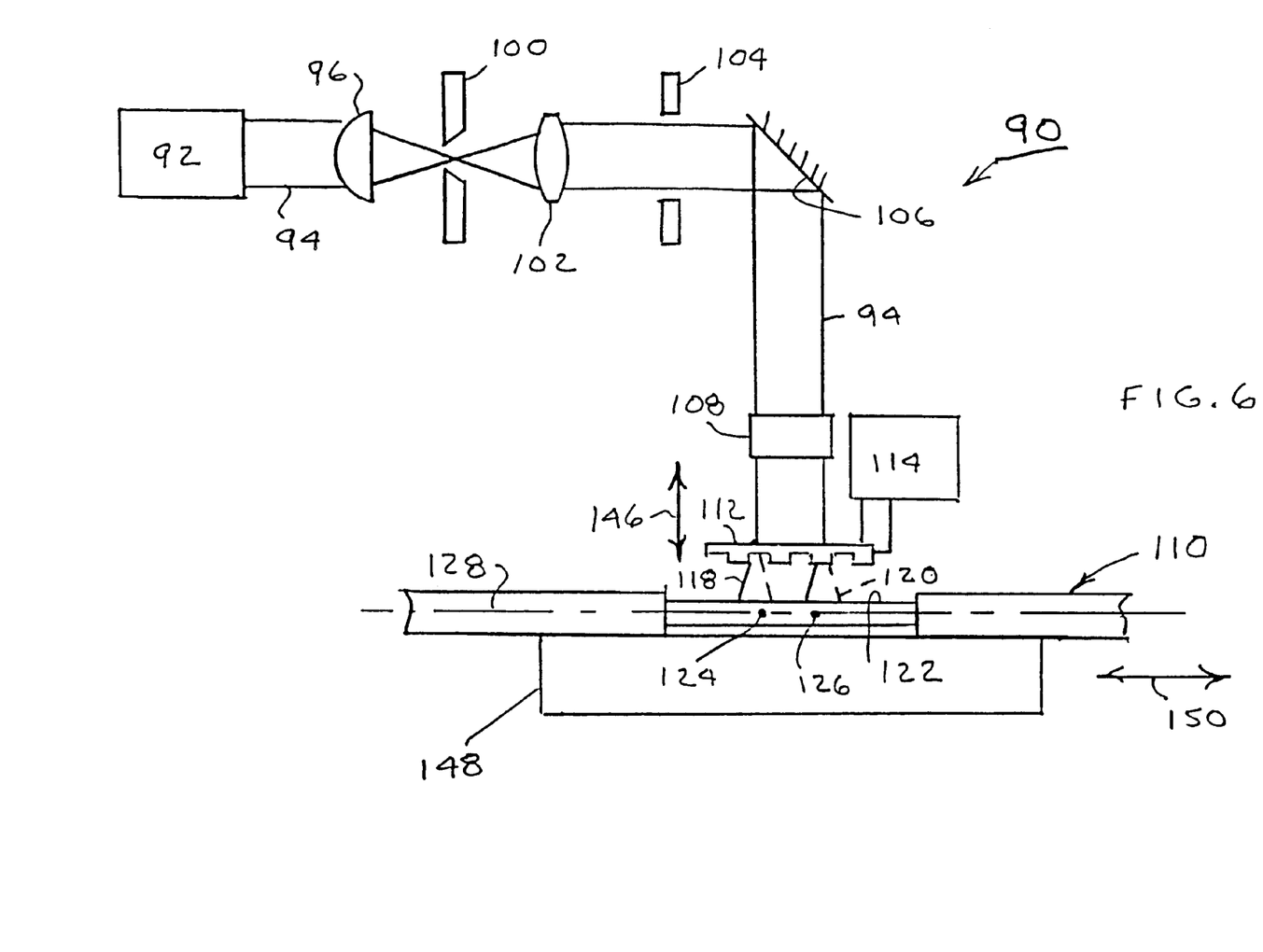
FIG. 6 is a diagram of an optical arrangement for producing two spatially displaced beams with a phase mask that is offset from the illuminated waveguide.

Our invention in one or more of its various embodiments provides an additional freedom to level the average refractive index 12 while maintaining the pulse-shaped variation in the peak-to-trough magnitudes of the index modulations 10. Two such embodiments are depicted in FIGS. 3 and 6.

Figure 3:
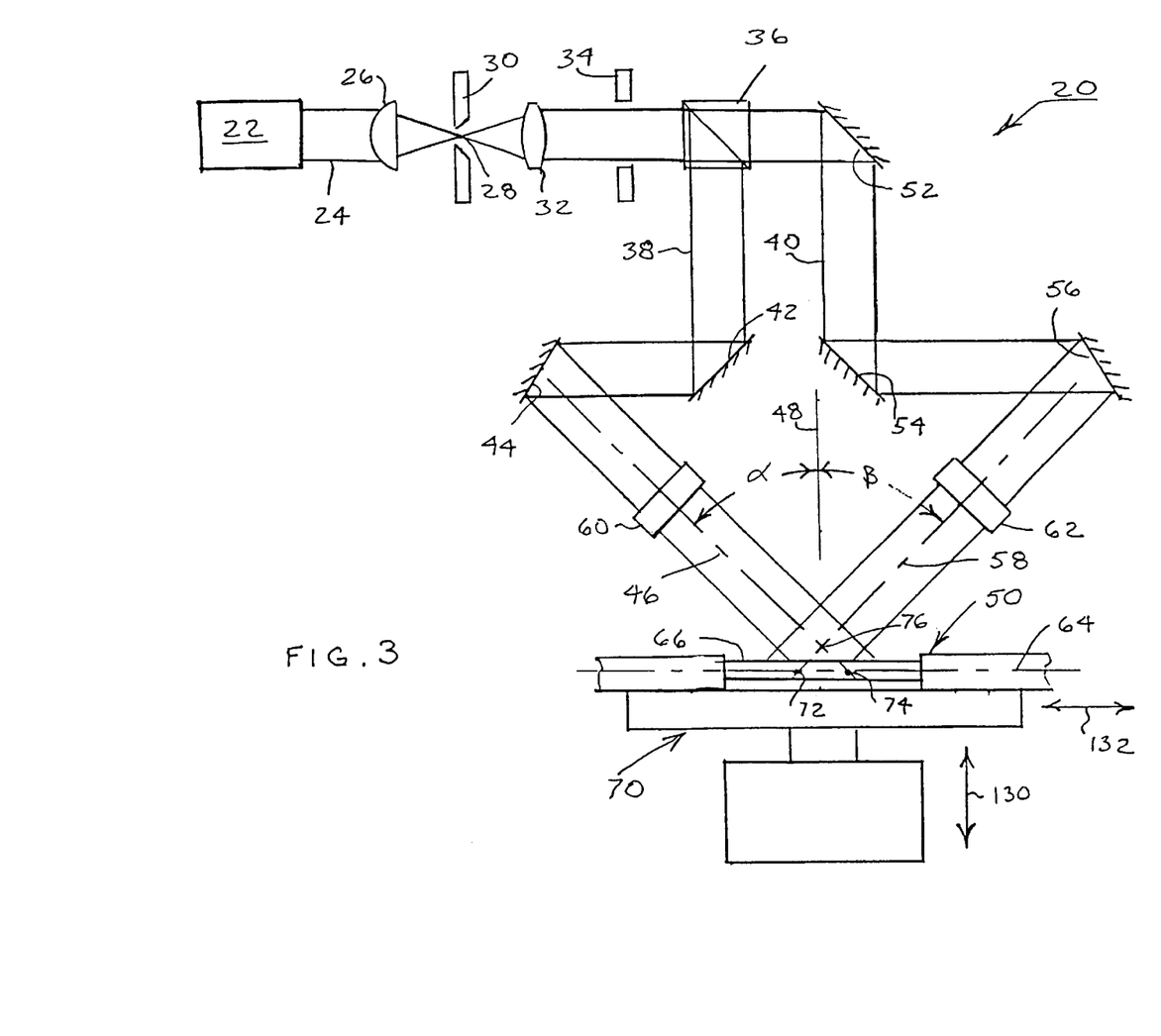
FIG. 3 is a diagram of an interferometer arranged for interfering two beams in spatially displaced positions along an optical axis of a waveguide.

The embodiment of FIG. 3 is arranged as an interferometer 20 having a laser source 22 for producing a beam 24 of actinic, temporally coherent radiation. The laser source 22 can be an excimer-pumped frequency-doubled dye laser operating in a wavelength range between 200 and 250 nm for writing gratings. However, other lasers and other wavelengths can also be used in combination with material sensitive to the alternative wavelengths and power regimes. Pulsed or continuous wave radiation can be used.

A cylindrical lens 26 converges the beam 24 through a line focus 28. A spatial filter 30 in the vicinity of the line focus 28 diverts high spatial frequency components of the beam 24 for enhancing the beam's spatial coherency. Details of our preferred spatial filter 30 are disclosed in U.S. patent application No. 09/081,912 filed May 19, 1998 entitled "Spatial Filter for High Power Laser Beam", now U.S. Pat. No. 6,178,045 which is hereby incorporated by reference. Leaving the spatial filter 30, the beam 24 has a $sinc^2$ intensity profile. A collimator 32 collimates the beam 24, and a second spatial filter 34 removes side lobes from its $sinc^2$ intensity profile.

A beamsplitter block 36 divides the beam 24 into two beams—a reflected beam 38 and a transmitted beam 40, each with the truncated $sinc^2$ intensity profile. Mirrors 42 and 44 orient a central axis 46 of the reflected beam 38 through an angle $\alpha$ with respect to a line 48 that extends normal to an optical waveguide 50 under manufacture. Mirrors 52, 54, and 56 convey the transmitted beam 40 through an equal number of reflections and orient a central axis 58 the transmitted beam 40 at an equal but opposite sign angle $\beta$ to the line 48.

Cylindrical lenses 60 and 62, which are oriented perpendicular to the cylindrical lens 26, increase the power densities of the two beams 38 and 40 by converging the beams 38 and 40 toward respective line focuses in a common axial plane of the waveguide 50 (i.e., the drawing plane of FIG. 3). Beam widths on the order of 5 to 100 micron overlap along an optical axis 64 of the waveguide 50 for lengths on the order of 5 to 30 mm. Energy densities of the impinging radiation are estimated at approximately 200 $mJ/cm^2$/pulse.

The waveguide 50, which can take such forms as an optical fiber or a planar optic, has an exposed portion 66 that includes a photosensitive core surrounded by a cladding. An exemplary photosensitive core is made from a combination of silica and germanium, while the cladding can be composed of silica alone. Hydrogen loading can be used to enhance photosensitivity.

An adjustable waveguide mount 70 positions the waveguide 50 with respect to the overlapping beams 38 and 40. Unlike conventional practice, the central axes 46 and 58 of the beams 38 and 40 intersect each other in a position 76 that is offset from optical axis 64 of the waveguide 50. In other words, the central axes 46 and 58, which correspond to the peak intensities of the beams 38 and 40, intersect the optical axis 64 of the waveguide 50 in relatively displaced positions 72 and 74 along the optical axis 64.

The misalignment between the central axes 46 and 58 of the beams 38 and 40 where they intersect the optical axis 64 of the waveguide 50 necessitates a high degree of spatial coherency between the beams 38 and 40 to achieve the desired fringe contrast in the resulting interference pattern that illuminates the exposed portion 66 of the waveguide 50. The spatial filter 30 is arranged to fulfill this requirement.

The central axes 46 and 58 of the two beams 38 and 40 are preferably spaced apart along the optical axis 64 by at least one-half of their full width at half maximum intensity. However, for $sinc^2$ intensity profiles, a separation of approximately 0.88 of their full width at half maximum intensity appears to be optimum. Too little separation between the axes 46 and 58 (i.e., peak intensities) along the optical axis 64 can leave the refractive index too high at the center of the grating with respect to its two ends. Too much separation can excessively reduce the refractive index at the center of the grating with respect to its too ends and can also excessively shorten the length of overlap between the beams 38 and 40 within which the index modulations are written.

So far, the interferometer 20 has been described with respect to a single exposure of the waveguide 50. The invention also contemplates a second exposure specifically directed to adjusting the average refractive index of the waveguide core without changing the peak-to-trough magnitudes of the index modulations. The second exposure preferably takes place with two overlapping beams, but interference fringe effects on the waveguide cores are avoided.

The adjustable waveguide mount 70 can be moved in the direction of arrows 130 to change the separation of the peak intensities 72 and 74 of the beams 38 and 40 along the optical axis 64. The amount of separation during the second exposure is preferably more than the separation during the first exposure and is determined as a function of the width of the beams 38 and 40 and the desired side lobe suppression. The first exposure optimizes the peak-to-trough magnitude variations of the index modulations, and the second exposure further optimizes the average refractive index of the index modulations. In other words, only the first exposure affects the peak-to-trough magnitude variations of the index modulations, but both the first and second exposures affect the average refractive index of the index modulations.

Interference between the beams 38 and 40 can be prevented during the second exposure by reducing spatial coherence between the beams. Spatial coherence can be reduced by substituting an amplitude mask for spatial filter 30 with the same transmittance function. Diffusing optics could also be used to further reduce spatial coherence, or the beams 38 and 40 could be relatively sheared to increase their effective spatial offset.

Alternatively, interference fringes between the beams 38 and 40 can be "washed out" by dithering the optical waveguide 110 or the phase mask 112 in the direction of arrows 132. Any point along the optical axis 64 of the waveguide portion 66 is exposed to the average intensity of the interference pattern spanning a plurality of fringes.

Figure 4:
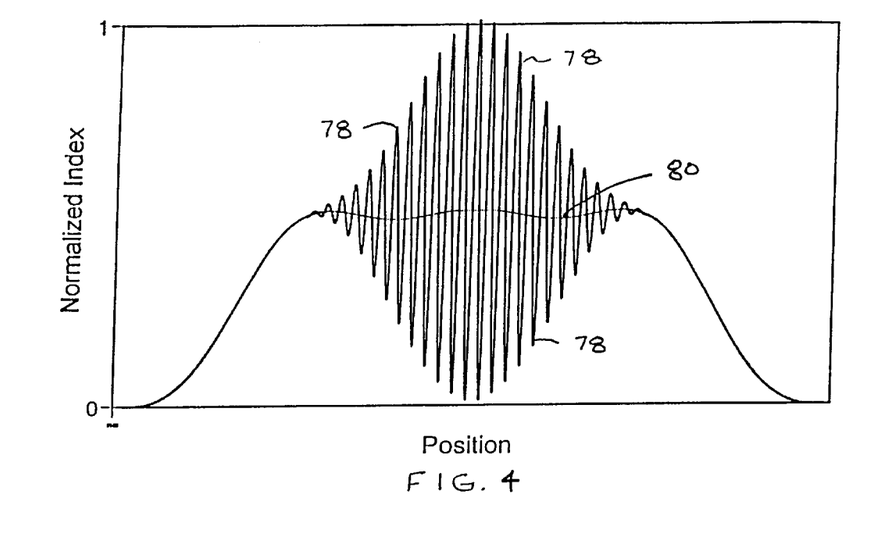
FIG. 4 is a graph of exemplary index modulations produced by two exposures with spatially displaced beams.
Figure 5:
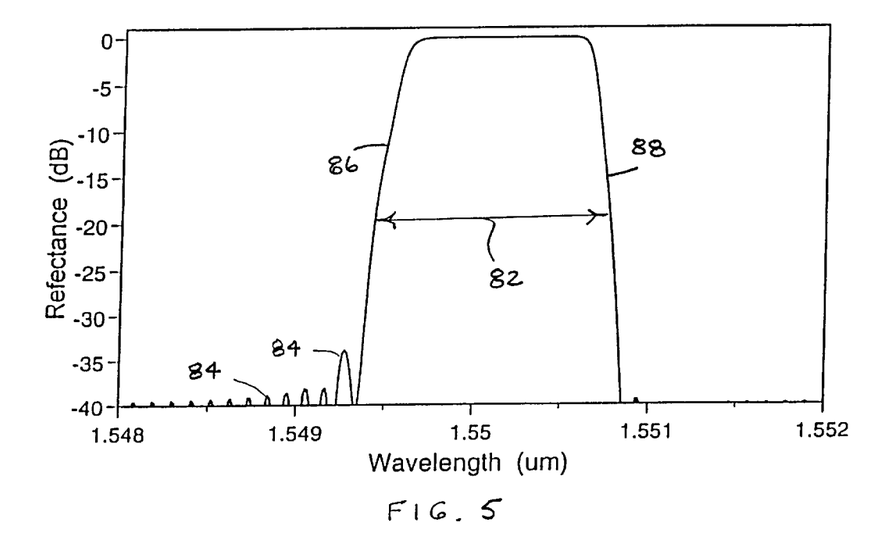
FIG. 5 is a graph of the spectral response associated with the index modulations of FIG. 4.

The improved results of the two exposures are shown in the graphs of FIGS. 4 and 5. The required pulse-shaped variation in the peak-to-trough magnitudes of the index modulations 78 are optimized by the first exposure, while both the first and second exposures contribute to a leveling of the average refractive index 80 throughout the range of the index modulations 78. The spectral response graphed in FIG. 5 shows a desired reflectance band 82 of the completed Bragg grating is achieved with a significant reduction in the magnitudes of side lobes 84. Steeper sides 86 and 88 of the reflectance band 82 also provide improved performance (e.g., reduced crosstalk) of the grating.

The various components of the interferometer 20 can be arranged in different ways, added to, subtracted from, or substituted for while still achieving the result of a more level average refractive index produced by single-lobed beams in fixed partially overlapping positions. For example, the $sinc^2$ intensity profile of the beam 24 is the result of the particular spatial filter 30, but other single-lobed beam profiles including Gaussian beam profiles could also be used. The collimator 32, if required at all, could be positioned after the second spatial filter 34, or a pair of collimators 32 could be positioned after the beamsplitter 36. More or less reflectors 42, 44, 52, 54, and 56 could be used to relatively orient the beams 38 and 40, and the crossing point 76 of the beam axes 46 and 58 can be located either before or after the optical axis 64 of the waveguide 50.

Imaging optics could also be used to image the interference pattern from a desired plane onto the exposed portion 66 of the waveguide 50 with or without magnification. The desired plane holds the interference pattern that would otherwise be directly formed on the exposed portion 66 of the waveguide 50.

Another embodiment 90 for achieving similar results is shown in FIG. 6. The starting point is again a source 92 of actinic radiation, such as an excimer laser operating at a wavelength of 193 nm or 248 nm. Again, other lasers and other wavelengths can be used to suit particular applications or materials. A cylindrical lens 96 in conjunction with a spatial filter 100 enhances the spatial coherency of a beam 94 of the actinic radiation. The intensity profile of the beam 94 is further shaped by a second spatial filter 104 that receives the beam 94 from a collimator 102. A mirror 106 directs the further shaped beam 94 to another cylindrical lens 108 that is rotated through 90 degrees with respect to the cylindrical lens 96 for converging the beam toward a line focus in an axial plane (i.e., the plane of drawing FIG. 6) of an optical waveguide 110 under manufacture. Within the axial plane, the beam 94 remains collimated.

A phase mask 112 supported on an adjustable mount 114 interrupts the collimated/converging beam 94 and divides the beam 94 into two collimated but relatively diverging beams 118 and 120 in the axial plane of the optical waveguide 110. The phase mask 112, which is itself a diffraction grating, preferably has a constant period and is further arranged to direct most of the impinging radiation into opposite sign first orders of the grating. Other combinations of orders could also be used including combination of zero and first orders, but the two first orders are preferred.

In the vicinity of the phase mask 112, the two beams 118 and 120 overlap and interfere. However, instead of positioning the phase mask 112 directly against an exposed portion 122 of the waveguide 110, the phase mask 112 can be spaced apart from the exposed portion 122 by an amount that separates peak intensities 124 and 126 (preferably corresponding to center axes) of the two beams 118 and 120 along an optical axis 128 of the waveguide 110. Spacings of 1 mm to 5 mm are expected to be typical, but larger or smaller spacings can also be used in accordance with the width of the two beams and the desired spectral response of the completed grating.

For arranging a second exposure, the phase mask 112 is relatively movable in the direction of arrows 146 on the adjustable mount 114 to change the separation of the peak intensities 124 and 126 of the beams 118 and 120 along the optical axis 128. The separation between the peak intensities could also be changed by moving the waveguide. 110 on its support 148 similar to the embodiment of FIG. 3. Also, interference effects can be similarly avoided by reducing spatial coherence or washing out the fringes by dithering the waveguide 110 or the phase mask 112 in the direction of arrows 150.

Although the two exposures have been referred to in both embodiments as first and second exposures to distinguish them from each other, the two exposures can take place in either order—first then second or second then first. The peak intensities 72, 74 or 124, 126 of at least one of the two exposures are displaced along the optical axis 64 or 128 of the optical waveguide 50 or 110, but the peak intensities of the other of the two exposures may not be necessarily displaced along the optical axis 64 or 128, depending on the desired side lobe suppression.

The index modulations of long period gratings are much more widely spaced than the index modulations of Bragg gratings, and more options are available for writing them including digital amplitude masks. However, a second exposure, particularly with a phase mask, for simultaneously exposing the gratings to two relatively displaced beams can improve performance by leveling the average refractive index of the longer index modulations while washing out any fringes.

The Bragg gratings produced according to this invention are particularly useful in communication systems. For example, the Bragg gratings can be used to add or drop specific channels or to individually separate the channels in a demultiplexing capacity. Other uses include sensors, dispersion compensators, or laser pump stabilizers. The long period gratings produced according to this invention function best as spectrally selective or band-rejection filters for improving operations of devices such as optical amplifiers and noise reducers.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

We claim:

1. A method of forming an optical filter comprising the steps of:

providing an optical waveguide medium having a refractive index that can be altered by exposure to actinic radiation;

orienting two angled beams of the actinic radiation having peak intensities to illuminate the optical waveguide medium;

positioning the optical waveguide medium at a first distance from a crossing point of the two angled beams within a range of the spatial coherence of the two beams for forming an interference pattern along the optical waveguide medium;

the crossing pint of the two angled beams corresponding to an intersection of the peak intensities of the two angled beams; and positioning the optical waveguide medium at a second distance from the crossing point of the two angled beams for reducing variation in the average intensity imparted to the optical waveguide medium within a spatial extent of the interference pattern, wherein the steps of positioning are related by a step of relatively translating the optical waveguide medium with respect to the crossing point of the two angled beams from the first distance to the second distance without changing an inclination of the optical waveguide medium with respect to either of the two angled beams.

2. The method of claim 1 including the step of dividing a common beam of the actinic radiation into the two angled beams.

3. A method of forming an optical filter comprising the steps of:

providing an optical waveguide medium having a refractive index that can be altered by exposure to actinic radiation;

orienting two angled beams of the actinic radiation to illuminate the optical waveguide medium;

positioning the optical waveguide medium at a first distance from a crossing point of the two angled beams within a range of the spatial coherence of the two beams for forming an interference pattern along the optical waveguide medium;

positioning the optical waveguide medium at a second distance from the crossing point of the two angled beams for reducing variation in the average intensity imparted to the optical waveguide medium within a spatial extent of the interference pattern;

dividing a common beam of the actinic radiation into the two angled beams; and spatially filtering the common beam of actinic radiation.

4. The method of claim 3 including the step of arranging the common beam to exhibit a sinc$^2$ intensity profile.

5. The method of claim 2 in which said step of dividing the common beam is performed by a beamsplitter.

6. The method of claim 2 which said step of dividing the common beam is performed by a phase mask.

7. A method of making an optical filter in an optical waveguide medium comprising:

illuminating the optical waveguide medium with a first set of overlapping beams of actinic radiation having peak intensities located in a first fixed relative position along the optical waveguide medium;

producing index modulations in the optical waveguide medium corresponding to a pattern of interference formed on the optical waveguide medium by the first set of overlapping beams in the first fixed relative position;

illuminating the optical waveguide medium with a second set of overlapping beams of actinic radiation having peak intensities located in a second fixed relative position along the optical waveguide medium; and adjusting an average index of the illuminated optical waveguide medium with the second set of overlapping beams in the second fixed relative position so that the average index of the illuminated optical waveguide medium exhibits less variation throughout the range of index modulations formed in the optical waveguide medium.

8. The method of claim 7 in which said step of adjusting includes rendering the average index substantially constant throughout the range of index modulations.

9. A method of making an optical filter in an optical waveguide medium comprising:

illuminating the optical waveguide medium with a first set of overlapping beams of actinic radiation having peak intensities located in a first fixed relative position along the optical waveguide medium;

producing index modulations in the optical waveguide medium corresponding to a pattern of interference formed on the optical waveguide medium by the first set of overlapping beams in the first fixed relative position;

illuminating the optical waveguide medium with a second set of overlapping beams of actinic radiation having peak intensities located in a second fixed relative position along the optical waveguide medium;

adjusting an average index of the illuminated optical waveguide medium with the second set of overlapping beams in the second fixed relative position so that the average index of the illuminated optical waveguide medium exhibits less variation throughout the range of index modulations formed in the optical waveguide medium; and said step of illuminating the optical waveguide medium with a second set of overlapping beams including separating peak intensities of the overlapping beams along the optical waveguide medium by at least one-half of the beams' full width at half maximum intensity.

10. The method of claim 7 including the step of spatially filtering a common beam from which the first and second sets of overlapping beams are divided to extend spatial coherence between the different locations of the peak intensities of the first and second sets of overlapping beams so that the pattern of interference formed by the first set of overlapping beams is preserved by the second set of overlapping beams.

11. The method of claim 7 including the further step of resisting the alteration of the index modulations along the optical waveguide medium by the second set of overlapping beams.

12. A method of making an optical filter comprising the steps of:

providing an optical waveguide medium having a refractive index that can be altered by exposure to actinic radiation;

directing a first beam of actinic radiation through a phase mask located in a first stationary position with respect to the optical waveguide;

diffracting the first beam into a first set of overlapping beams that produce index modulations along an optical axis of the optical waveguide medium;

relatively moving the phase mask from the first stationary position to a second stationary position with respect to the optical waveguide;

directing a second beam of actinic radiation through the phase mask located in the second stationary position;

diffracting the second beam into a second set of overlapping beams that alter an average refractive index along the optical axis of the optical waveguide medium; and said first and second stationary positions being spaced apart through a distance sufficient to render the average refractive index of the optical waveguide medium substantially constant throughout a common region altered by the first and second sets of overlapping beams.

13. The method of claim 12 in which said step of relatively moving includes relatively translating the phase mask with respect to the optical waveguide between the first and second stationary positions in a direction substantially normal to the optical axis of the optical waveguide.

14. The method of claim 13 in which both sets of overlapping beams are located in a common axial plane of the optical waveguide.

15. The method of claim 13 in which the second position spaces the phase mask at least one millimeter from the optical waveguide.

16. The method of claim 12 in which the phase mask has a constant pitch.

17. A method of making an optical filter comprising the steps of:

providing an optical waveguide medium having a refractive index that can be altered by exposure to actinic radiation;

directing a first beam of actinic radiation through a phase mask located in a first position with respect to the optical waveguide;

diffracting the first beam into a first set of overlapping beams that produced index modulations along an optical axis of the optical waveguide medium;

relatively moving the phase mask from the first position to a second position with respect to the optical waveguide;

directing a second beam of actinic radiation through the phase mask located in the second position; and diffracting the second beam into a second set of overlapping beams that alter an average refractive index along the optical axis of the optical waveguide medium, wherein the second set of overlapping beams have peak intensities that are separated along the optical waveguide medium by at least one-half of the beams' full width at half maximum intensity.

18. The method of claim 17 in which said step of diffracting the second beam includes rendering the average index substantially constant along the optical axis of the optical waveguide medium within a range of overlap between the first set of overlapping beams.

19. A method of making an optical fiber comprising the steps of:

providing an optical waveguide medium having a refractive index that can be altered by exposure to actinic radiation;

directing a first beam of actinic radiation through a phase mask located in a first position with respect to the optical waveguide;

diffracting the first beam into a first set of overlapping beams that produce index modulations along an optical axis of the optical waveguide medium;

relatively moving the phase mask from the first position to a second position with respect to the optical waveguide;

directing a second beam of actinic radiation through the phase mask located in the second position;

diffracting the second beam into a second set of overlapping beams that alter an average refractive index along the optical axis of the optical waveguide medium; and spatially filtering the first beam of actinic radiation for enhancing spatial coherence.

20. The method of claim 12 including the further step of resisting the alteration of the index modulations along the optical axis by the second set of overlapping beams.

21. A method of apodizing an optical filter formed by index modulations along an optical axis of a waveguide medium comprising the steps of:

dividing a beam of actinic radiation into overlapping beams having axes that extend in their directions of propagation;

illuminating the waveguide medium with the overlapping beams;

separating the axes of the overlapping beams along the optical axis of the waveguide medium;

resisting alteration of the index modulations along the optical axis resulting from interference effects between the overlapping beams so that an average refractive index can be adjusted along the optical axis without substantially changing magnitudes of the index modulations along the optical axis; and said step of separating including separating the axes of the overlapping beams along the optical axis of the waveguide medium by at least one-half of the beams' full width at half maximum intensity.

22. The method of claim 21 in which said step of resisting provides for relatively dithering the waveguide medium with respect to the overlapping beams.

23. The method of claim 21 in which said step of dividing includes using a phase mask for dividing the beams.

24. The method of claim 23 in which said step of resisting provides for dithering the phase mask.

25. The method of claim 21 in which said step of resisting includes reducing spatial coherence of the overlapping beams.

26. A method of apodizing an optical filter formed by index modulations along an optical axis of a waveguide medium comprising the steps of:

directing a beam of actinic radiation through a phase mask that divides the beam into overlapping beams that illuminate the waveguide medium;

spacing the phase mask apart from the waveguide medium by an amount that separates peak intensities of the overlapping beams along the optical axis; and resisting alteration of index modulations along the optical axis resulting from interference effects between the overlapping beams so that an average refractive index can be adjusted along the optical axis without substantially changing magnitudes of the index modulations along the optical axis.

27. The method of claim 26 in which said step of spacing includes separating the peak intensities of the overlapping beams along the optical axis by at least one-half of the beams' full width at half maximum intensity.

28. The method of claim 26 in which said step of resisting provides for dithering.

29. The method of claim 26 in which said step of resisting provides for relatively dithering the waveguide medium with respect to the overlapping beams.

30. The method of claim 26 in which said step of resisting includes reducing spatial coherence of the overlapping beams.

* * * * *